T. E. HOLMES.
MEANS FOR SECURING COLUMNS IN HYDRAULIC PRESSES AND LIKE MACHINES AND FOR ANALOGOUS PURPOSES.
APPLICATION FILED JULY 6, 1918.

1,322,442.

Patented Nov. 18, 1919.

INVENTOR
THOMAS EDMUND HOLMES
BY
ATTORNEYS

UNITED STATES PATENT OFFICE.

THOMAS EDMUND HOLMES, OF GLASGOW, SCOTLAND.

MEANS FOR SECURING COLUMNS IN HYDRAULIC PRESSES AND LIKE MACHINES AND FOR ANALOGOUS PURPOSES.

1,322,442.     Specification of Letters Patent.     Patented Nov. 18, 1919.

Application filed July 6, 1918. Serial No. 243,728.

*To all whom it may concern:*

Be it known that I, THOMAS EDMUND HOLMES, a subject of the King of Great Britain and Ireland, and a resident of Glasgow, Scotland, have invented certain new and useful Improved Means for Securing Columns in Hydraulic Presses and like Machines and for Analogous Purposes, of which the following is the specification.

The invention has for its object to provide improved simple and effective means for securing columns in the entablatures and bases or platens of presses and other hydraulic machines, which means are applicable also for securing columns, rods, pins and the like in other situations in which they are subjected to heavy lateral stresses.

In carrying out the invention the column or the like has formed on it a collar or shoulder the plane face of which abuts and is held up against a plane face on the entablature or other part by a nut or nuts screwed upon the end of the column extending through the entablature. The face on the entablature is formed within a concentric recess, or within a concentric upstanding flange of an internal diameter greater than that of the collar. The periphery of the recess, or if there be an upstanding flange, the internal periphery thereof is of conical form. Or, alternatively, the periphery of the collar or the part of the column beyond the shoulder may be conical. Or one or both may be conical, or one or other parallel.

There is inserted in the annular space thus formed around the collar or shoulder on the column a ring the internal and external faces of which are counterpart to the collar and recess. This ring is circumferentially divided into several parts and is secured in position by studs and nuts or screw-bolts passed through it and into the entablature.

Upon the column having been drawn into place, the divided ring is inserted and drawn up, its wedging action not only centering the column but transmitting all lateral stresses from it to the walls of the recess or upstanding flange. The whole thus forms a construction particularly well adapted to resist heavy lateral stress.

Figure 1:
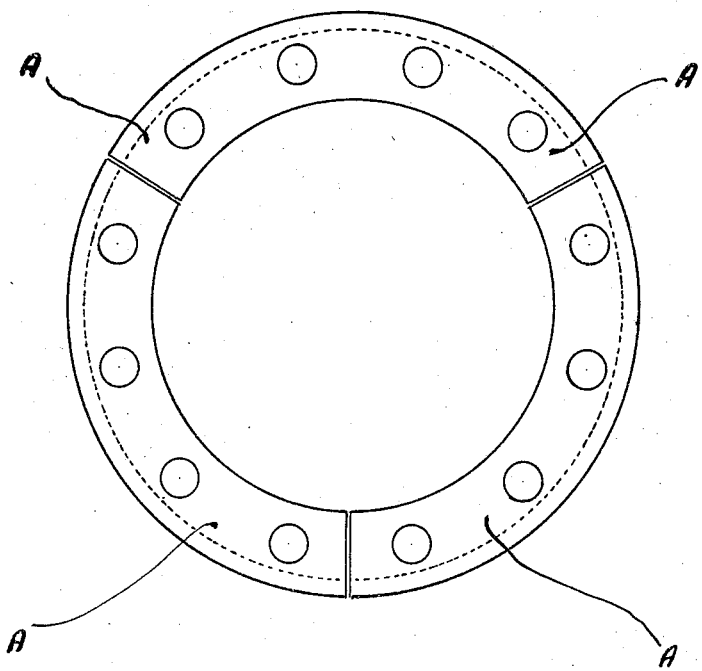
Figure 2:
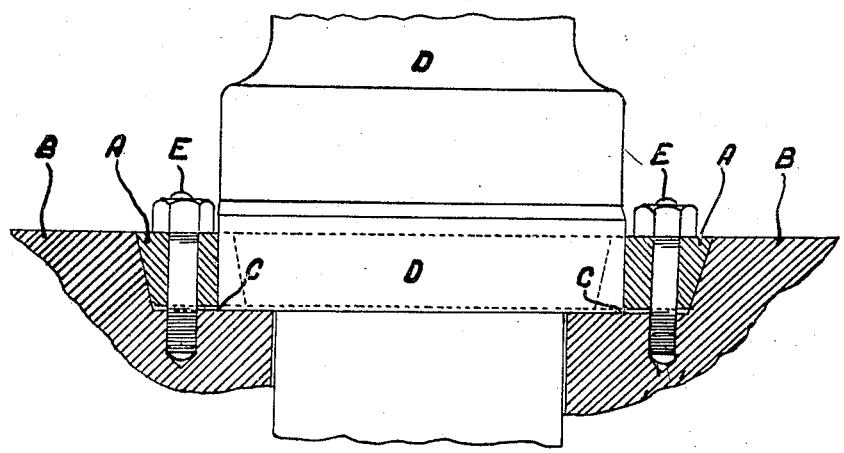

A simple illustrative example of the carrying out of the invention is shown on an accompanying sheet of drawings, Figure 1 being a plan of the divided locking ring and Fig. 2 a sectional elevation of the whole device assembled.

In this example the outer periphery of the tripartite ring A is conical as is the internal periphery of the recess in the entablature B, while the shoulder C on the column D is parallel. The ring is secured in place on studs screwed into the bottom of the recess in the entablature by nuts E.

What I claim is:—

1. The combination with a column or the like having a collar, of an entablature receiving the column and having a seat against which said collar rests, a wall upstanding from said seat and spaced from the said collar, a divided ring of taper cross-section interposed between said upstanding wall and collar, and means for securing said ring to the entablature, the coacting surfaces against which said ring bears being shaped to secure a wedge action for the ring when the latter is secured in position.

2. The combination with a column or the like having a collar, of an entablature receiving said column and having a seat against which said collar rests, a wall with outwardly flaring surface upstanding from said seat and spaced from said collar, a divided externally tapered ring interposed between said upstanding wall and collar, and means for securing said ring to the entablature with a wedging action between the peripheral bearing surfaces which it engages, substantially as described.

In testimony whereof I have signed my name to this specification, in the presence of two subscribing witnesses.

THOMAS EDMUND HOLMES.

Witnesses:
DAVID FERGUSON,
JAMES EAGLESOM.